United States Patent

[11] 3,536,243

| [72] | Inventor | Leonard James Higgins<br>Schenectady, New York |
|---|---|---|
| [21] | Appl. No. | 696,271 |
| [22] | Filed | Jan. 8, 1968 |
| [45] | Patented | Oct. 27, 1970 |
| [73] | Assignee | By mesne assignments, to<br>Branson Instruments, Incorporated<br>Stamford, Connecticut<br>a corporation of Delaware |

[54] ULTRASONIC SOLDERING APPARATUS
4 Claims, 10 Drawing Figs.
[52] U.S. Cl. .................................................. 228/37,
29/503, 228/36
[51] Int. Cl. .................................................... B23k 1/08
[50] Field of Search .................................... 228/1, 37

[56] References Cited
UNITED STATES PATENTS

| 3,084,650 | 4/1963 | Johns | 228/37 |
| 3,277,566 | 10/1966 | Christensen | 228/1 |
| 3,266,136 | 8/1966 | Gutbier | 228/1 |
| 3,303,983 | 2/1967 | Patrick | |

Primary Examiner—John F. Campbell
Assistant Examiner—Robert J. Craig
Attorney—Ervin B. Steinberg ABSTRACT: An apparatus for soldering small electronic components to printed circuit boards and other similar applications in which ultrasonic energy is coupled to molten solder to form a stable bead of solder whose crest is above the immediately surrounding region.

Patented Oct. 27, 1970 3,536,243
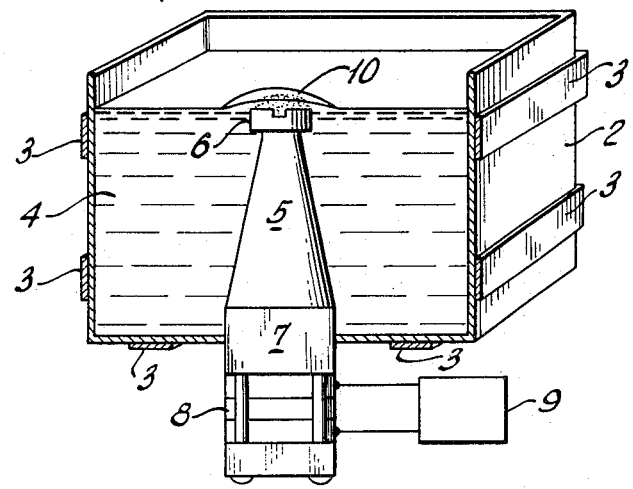
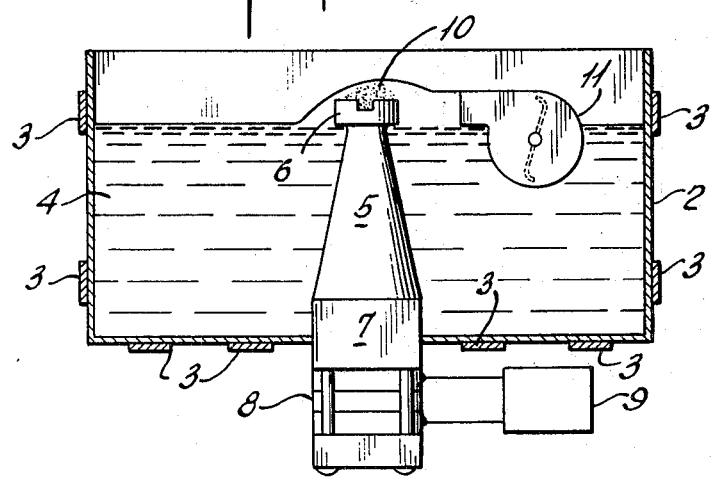
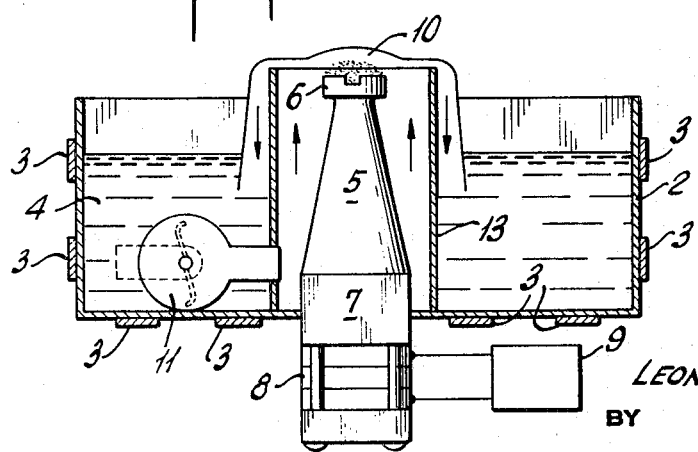
INVENTOR
LEONARD J. HIGGINS
BY
ATTORNEY

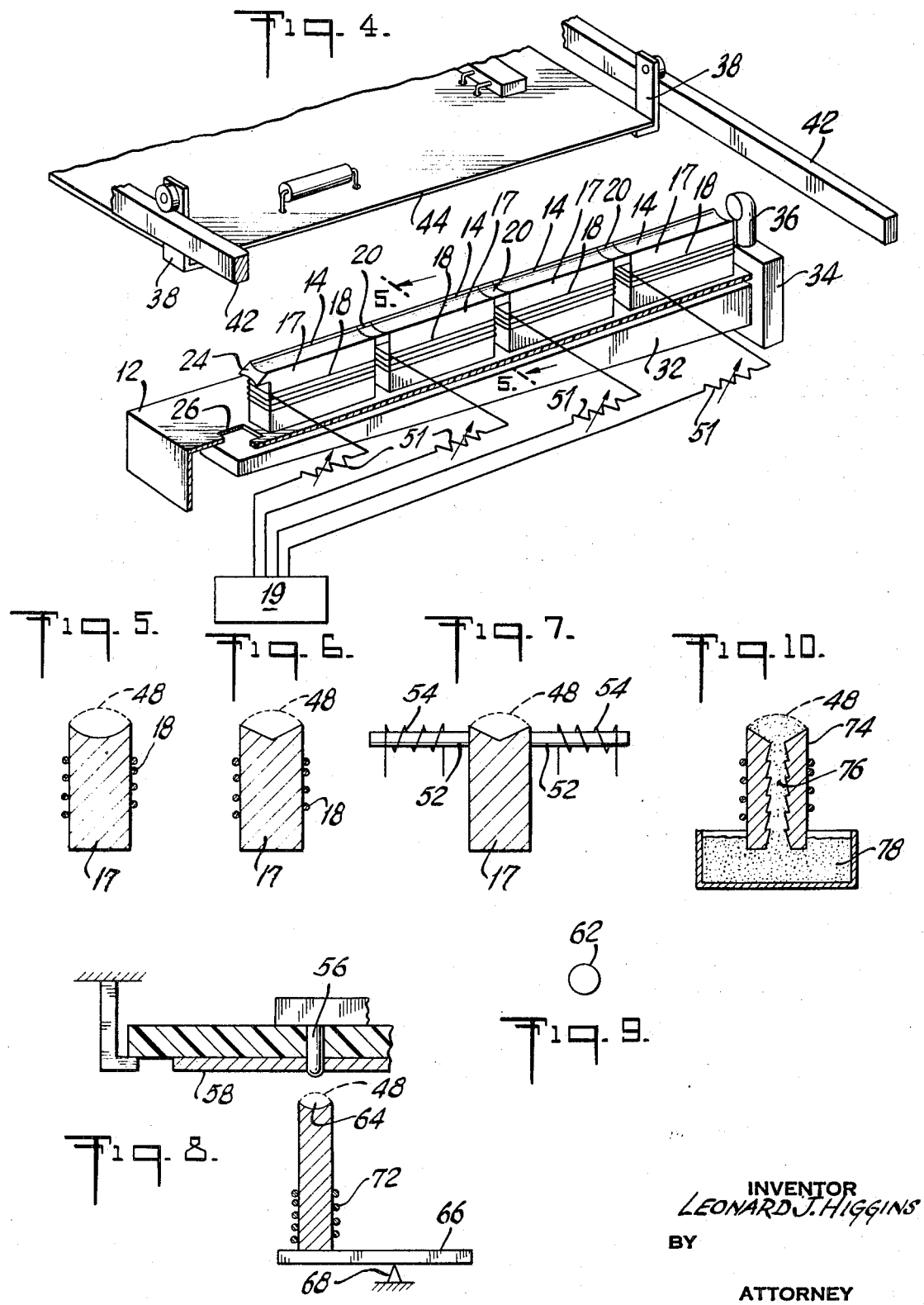

ULTRASONIC SOLDERING APPARATUS

BACKGROUND OF THE INVENTION

This invention relates to an ultrasonic soldering apparatus and, more particularly, to an improved apparatus for soldering electronic component leads to printed circuit boards.

In the prior art, ultrasonic energy has been used to produce cavitation in molten solder, which cleans the parts to be soldered and breaks the oxide layers which tend to form on the parts. This permits the parts to be soldered without flux. Usually, in ultrasonic soldering, the molten solder is contained in a relatively deep pot into which the parts are dipped. However, dip soldering is not satisfactory for soldering component leads to printed circuit boards and other similar applications.

For soldering printed circuit boards, proposals have been made to form a solder fountain by applying ultrasonic energy to the bottom of the solder pot. However, such proposals have not proved completely satisfactory owing to the large amount of energy required to raise the fountain, and, even more importantly, the difficulty in controlling the size, shape and position of the fountain.

One object of this invention is the provision of a simple, economical ultrasonic soldering apparatus for soldering component leads to printed circuit boards.

Another object of the invention is the provision of an ultrasonic soldering apparatus which forms a small, well defined raised region of solder in order to minimize heat transfer to the part to be soldered by restricting contact with the solder surface to the active or working region.

A further object of the invention is to provide an ultrasonic soldering apparatus for soldering printed circuit board components on a production line basis.

A still further object of the invention is to provide an ultrasonic soldering apparatus which can accurately deposit a small predetermined quantity of solder.

SUMMARY OF THE INVENTION

Briefly, this invention contemplates the provision of an ultrasonic soldering apparatus in which ultrasonic energy is coupled slightly below the surface of molten solder to form a stable bead whose crest extends above the surrounding region, permitting the solder to be applied to a component lead only in the area desired and without excessively heating the component. In addition, cavitation within the bead permits soldering without flux.

Having briefly described this invention, it will be described in greater detail along with other objects and advantages in the following detailed description of a preferred embodiment which may be best understood by reference in the accompanying drawings. These drawings form part of the instant specification and are to be read in conjunction therewith. Like reference numerals are used to indicate like parts in the various views.

BRIEF DESCRIPTION OF THE DRAWINGS

FIG. 1 is a side view of one embodiment of the ultrasonic soldering apparatus of the invention with certain parts shown in section;

FIG. 2 is a fragmentary schematic view of a wave soldering machine constructed in accordance with the teachings of this invention;

FIG. 3 is also a schematic view of another embodiment of the invention;

FIG. 4 is an isometric view (with parts broken away and parts omitted for clarity) of one embodiment of the invention for soldering printed circuit boards on continuous or production line basis;

FIG. 5 is a fragmentary sectional view taken along the line 5-5 of FIG. 1;

FIG. 6 is a sectional view similar to FIG. 5, but showing an alternate embodiment of the invention;

FIG. 7 is a sectional view similar to FIGS. 5 and 6 showing another alternate embodiment of the invention;

FIG. 8 is a side elevation, with parts in section, of another embodiment of the invention similar to the embodiments of FIG. 1;

FIG. 9 is a plan view of the soldering apparatus of FIG. 8; and

FIG. 10 is a sectional view of an alternate embodiment of the soldering apparatus of FIG. 8.

DESCRIPTION OF THE PREFERRED EMBODIMENT

Referring now to FIG. 1 of the drawings, a container or solder pot 2 has a number of strip electrical heaters 3 arranged to heat a mass of solder 4 inside the container to a molten state at a temperature suitable for soldering. The power supply for energizing the strip heaters 3 is not shown. A transducer 5 extends through the bottom of the container 2, and its tip 6 is disposed slightly below the upper surface of the molten solder 4. A gland 7 prevents solder from leaking out of the container. The transducer 5 is driven by a piezoelectric drive element 8 in the manner well known to those skilled in the art. The drive element 8 is energized by a suitable oscillator 9 capable of oscillating in the ultrasonic frequency range.

In operation, when the piezoelectric driver 8 is energized from oscillator 9, it drives the transducer 5, producing an ultrasonic vibration at the tip 6. This vibration produces cavitation in the molten solder 4 in the region of the tip 6 which raises a stable bead 10 of solder whose crest is above the surface of the solder in the surrounding region. The components to be soldered may be lowered until they just kiss the crest of the bead 10. Owing to the cavitation within the bead 10, the solder from the bead will wet the components and join them together in this single step operation even without flux.

It should be noted that sufficient energy is coupled to the molten solder 4 by the tip 6 to raise the bead 10, but that this energy is limited to a value which is less than that which would overcome the surface tension of the solder and cause it to splatter. In one exemplary embodiment of the invention, the tip 6 was disposed one-quarter of an inch below the surface of the molten solder and the driver 8 was energized at 27 kilocycles per second. The amount of energy coupled to the solder was approximately 600 watts.

Referring now to FIG. 2, a wave soldering machine may be constructed employing the principles described in connection with FIG. 1. In this embodiment, a pump, schematically indicated at 11, causes a thin layer of the solder 4 to flow across the tip 6. When the tip 6 is vibrated ultrasonically, in the manner previously explained in connection with FIG. 1, a ridge or wave of solder rises above the surface of the tip. It should be noted that solder which forms the ridge 10 is cavitating and that, therefore, component leads may be soldered together in one step without tinning of flux, if desired.

Referring now to FIG. 3, in this embodiment a pump 11 forces molten solder upward through a cylindrical well 13 which surrounds the transducer 5. The lip 15 of the well 13 is slightly above the upper surface of the transducer tip 6; the solder 4 overflows from the well and flows back to the container 2 which serves as a sump. This arrangement provides a constant quiescent solder level in the region of the tip 6 even though solder from the bead 10 is deposited upon the components soldered together.

Referring now to FIGS. 4 and 5, the ultrasonic soldering apparatus of this embodiment has four ultrasonic transducers or vibrators 17 mounted on a frame 12. Shallow troughs 14 formed in each of the vibrators 17 are aligned to form a channel along which molten solder can flow. Members 20 bridge the gaps between adjacent transducers to provide a continuous channel.

In the embodiment shown, each of the vibrators 17 are made of suitable magnetostrictive material and each is driven by a coil of wire 18 energized from a suitable ultrasonic oscillator 19.

The vibrators 17 are so mounted that the channel formed by the troughs 14 has a downwardly sloping pitch from right to left so that the flow of solder will be assisted by gravity. A spout 24 at the left-hand end of the channel directs the flow of solder through an opening 26 in the frame 12 into a receptacle 32. Preferably, the receptacle 32 has a downwardly sloping pitch from left to right and includes suitable electric heating coils (not shown) for heating the solder as it flows toward the right-hand end of the receptacle. A pump 34 lifts the solder through a conduit 36, from which it flows into the channel.

In operation, with molten solder flowing along and substantially filling the channel, the coils 18 are energized, and the ultrasonic vibration of the vibrators 17 produces cavitation in the solder, causing it to rise and form a quasi-stable bead of the general shape indicated by the dotted line 48 of FIG. 2. This bead 48 extends the length of the channel formed by the troughs 14. Again, it should be noted that the amount of energy coupled to the transducers is regulated and limited to the end that the molten solder forms a raised bead but does not splatter. The amount of energy required to raise the bead is a function of size and of the geometry of the trough and the temperature of the molten solder. Advantageously, the amount of energy coupled to each of the transducers 17 is individually variable so that the energy coupled to the leftmost vibrator 17, for example, may be made greater than that coupled to the right-hand transducer 17 where the temperature of the solder is higher. Potentiometers 51 may be used for the purpose.

Carriages 38, riding along parallel rails 42, carry a printed circuit board 44 along a path which is approximately perpendicular to the channel formed by the troughs 14 and at such a height that the bottom of the printed circuit board 44 passes slightly above the edges of the troughs. In this manner, the crest of solder bead 48 kisses the lower surface of the board soldering the component leads which extend through the board. Of course, a similar carriage arrangement may be provided advantageously in combination with the wave soldering arrangement of FIG. 2.

As shown in FIG. 5, the trough 14 is semicircular in cross section. It should be noted, however, that other geometries are also suitable for the practice of the invention. For example, a V-shaped trough as shown in FIG. 6, is also satisfactory.

Additionally, ultrasonic energy may be coupled satisfactorily to the molten solder by means other than that shown in FIG. 4. For example, as shown in FIG. 7, ultrasonic vibrators 52 may be spaced at intervals along the trough and coupled thereto. These vibrators 52 may conveniently comprise magnetostrictive rods energized by coils 54. Alternatively, such rods may be driven by a piezoelectric crystal or other suitable ultrasonic driving source known in the art.

To solder a single lead 56 to a printed conductor 58, the embodiment of the invention shown in FIGS. 8 and 9 may be used. In this embodiment, a rod 62 of small diameter has a slight depression 64 formed in its tip for containing molten solder.

With molten solder substantially filling the depression 64, the rod is vibrated ultrasonically, and a small bead 48 of molten solder rises above the rim of the depression 64. The rod may be mounted in a convenient manner known in the art; advantageously, so that the tip of the rod may be raised vertically, as indicated schematically by the lever 66 and fulcrum 68, until the crest of the bead 48 contacts the lead 56 and printed conductor 58. A small amount of solder will be deposited, forming a good bond without excessively heating the component lead. It will be that the embodiments of the invention shown in FIGS. 1 and 3 may be similarly employed, if desired, by raising and lowering the entire container 2 of those embodiments.

The rod 62 may be made of magnetostrictive material and vibrated by means of a coil 72 which is energized from a suitable oscillator, not shown. The solder in the cavity 64 may be heated in a suitable manner known in the art, as by means of a flame directed upon it, for example.

Referring to FIG. 10, the apparatus of FIGS. 1 and 5 may employ a hollow rod 74 through the center opening 76 of which molten solder may be lifted from a solder pot 78. For small center openings, serrations 80 are sufficient to raise the solder as the rod 74 vibrates ultrasonically. Alternatively, a pump may be employed to force solder upward through the opening 76.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

I claim:

1. A soldering device comprising:
   a. Tank means for containing molten solder and having a bottom, first and second side walls and first and second end walls, said bottom having a downwardly sloping pitch from said first toward said second side wall;
   b. A plurality of ultrasonic transducer means disposed in spaced-apart relationship and extending transversely of said tank means intermediate said first and second side walls, the top of each of said transducer means defining a shallow trough;
   c. A plurality of coupling members each having a top surface defining a shallow trough matching that defined by the top surface of said transducer means, said coupling members disposed in the spaces between said transducer means so that a continuous shallow trough is provided by the top surfaces of said transducer means and the coupling members, said transducer means and coupling members being arranged to provide that said continuous trough has a downwardly sloping pitch from said second toward said first side wall;
   d. Pump means is communication with the solder in said tank and supplying molten solder to said shallow trough to produce a flowing stream of molten solder; and
   e. Means for selectively energizing said transducer means operative to vibrate the molten solder flowing in said trough with different intensities at different locations along the flowing solder stream and producing cavitation in the solder stream flowing in said trough and raising a quasi-stable bead therealong.

2. The soldering device recited in claim 1 wherein said pump means supplies said molten solder to the end of said trough which is disposed nearer to said second side wall of said tank means.

3. The soldering device recited in claim 1 wherein each of said transducer means is provided with a bore and molten solder is pumped from said tank and through said bore to said shallow trough.

4. The soldering device recited in claim 2 wherein the inner surfaces of said bore have a plurality of serrations arranged from the bottom to the top thereof which operate when said transducers are energized to cause molten solder to be raised through the bores of said transducers and into the trough formed by the top surfaces thereof.